United States Patent [19]

Bachman et al.

[11] Patent Number: 4,939,640
[45] Date of Patent: Jul. 3, 1990

[54] DATA PROCESSING SYSTEM HAVING UNIQUE MICROINSTRUCTION CONTROL AND STACK MEANS

[75] Inventors: Brett L. Bachman, Boston, Mass.;
Richard A. Belgard, Saratoga, Calif.;
Richard G. Bratt, Wayland, Mass.;
Thomas M. Jones, Chapel Hill, N.C.

[73] Assignee: Data General Corporation, Westboro, Mass.

[21] Appl. No.: 597,195

[22] Filed: Apr. 5, 1984

Related U.S. Application Data

[63] Continuation of Ser. No. 266,537, May 22, 1981, abandoned.

[51] Int. Cl.$^5$ .................. G06F 09/22; G06F 09/46
[52] U.S. Cl. .................. 364/200; 364/254.5; 364/280.8
[58] Field of Search ... 364/200 MS File, 900 MS File

[56] References Cited

U.S. PATENT DOCUMENTS

| | | |
|---|---|---|
| 3,373,408 | 3/1968 | Ling ................. 364/200 |
| 3,614,740 | 10/1971 | Delagi ................. 364/200 |
| 3,725,868 | 4/1973 | Malmer, Jr. et al. ......... 364/200 |
| 3,735,363 | 5/1973 | Beers et al. ............. 364/200 |
| 3,889,243 | 6/1975 | Drimak ................ 364/200 |
| 3,938,098 | 2/1976 | Garlic ................. 364/200 |
| 3,972,029 | 7/1976 | Bailey, Jr. ............. 364/200 |
| 4,047,161 | 9/1977 | Davis ................. 364/200 |
| 4,167,779 | 9/1979 | Sullivan et al. .......... 364/200 |
| 4,173,782 | 11/1979 | Dixon ................ 364/200 |
| 4,275,441 | 6/1981 | Takeuchi .............. 364/200 |
| 4,325,120 | 4/1982 | Colley et al. ............ 364/200 |
| 4,338,662 | 7/1982 | Yokoyama ............. 364/200 |
| 4,367,524 | 1/1983 | Budde et al. ............ 364/200 |
| 4,398,244 | 8/1983 | Chu et al. ............. 364/200 |
| 4,438,492 | 3/1984 | Harmon, Jr. et al. ........ 364/200 |

Primary Examiner—Eddie P. Cahn
Attorney, Agent, or Firm—Robert F. O'Connell

[57] ABSTRACT

A data processing system which includes a memory and a processor comprising at least two execution units. The system further includes a microcode control unit for storing sequences of microinstructions and an execution microinstruction stack containing at least one stack frame containing the machine state of a first execution unit when the execution of a microinstruction has been interrupted. A memory microinstruction stack is provided to store a plurality of stack frames, stack frames being transferrable between the execution microinstruction stack and the memory microinstructiion stack. The microcode control unit contains sequences of monitor microinstructions and has associated with it a minotor microinstruction stack for storing the machine state of the first execution unit when the execution of a monitor microinstruction has been interrupted. A second execution unit for executing primarily arithmetic microinstructions includes an execution storage unit containing the current machine state of the second execution unit and an arithmetic stack which stores the machine state of the second execution unit when it has executed a previous arithmetic microinstruction. The memory includes a memory arithmetic stack containing further arithmetic stack frames, stack frames being transferrable between the execution storage unit and the memory arithmetic stack. Further an instruction stack is provided for storing the machine state in the processor when execution of a macroinstruction has been interrupted.

7 Claims, 1 Drawing Sheet

DATA PROCESSING SYSTEM HAVING UNIQUE MICROINSTRUCTION CONTROL AND STACK MEANS

This application is a continuation of application Ser. No. 266,537, filed May 22, 1981, now abandoned.

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handing. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem is conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to structure and operation of a data processing system suitable for use in interconnected data processing networks, which internal structure is flexible, protected from users, effectively invisible to users, and provides a flexible and simplified interface to users.

The data processing system includes a memory and a processor having at least two execution units. A first execution unit includes a microcode control unit for storing sequences of microinstructions for execution by the execution unit and a macroinstruction stack having one or more stack frames for storing the machine state of the execution unit when a microinstruction it has been executing has been interrupted. The memory further includes a memory microinstruction stack having stack frames containing the machine states of previously executing microinstructions which have been interrupted, thereby forming in effect an infinitely deep stack. The stack frames in such stacks can be transferred between them. Monitor microinstructions are also stored for performing sequences of monitor microinstructions and a monitor microinstruction stack having one or more stack frames is used to store the machine state of the execution unit when one or more monitor microinstructions is interrupted. A second execution unit for performing primarily arithmetic operations is also provided and includes an execution storage unit for storing the current machine state of the second execution means for a currently executing arithmetic microinstruction and an arithmetic stack for storing the machine state of the second execution unit for a previous arithmetic microinstruction which has been interrupted. The memory includes a memory arithmetic stack having one or more stack frames for storing the machine state of the second execution unit for previously executing arithmetic microinstructions which have been interrupted. Stack frames can be transferred between the execution storage unit and the memory arithmetic stack. A further macroinstruction stack having at least one stack frame is also provided to store the machine state of the processor when a macroinstruction has been interrupted.

Figure 1:
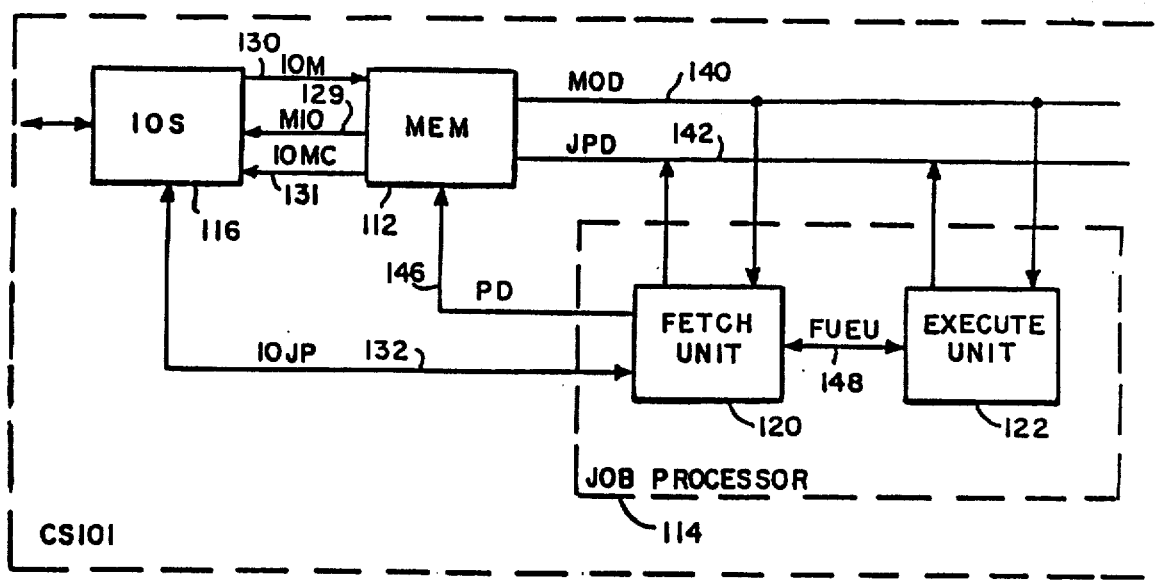
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

What is claimed is:

1. In a digital computer system for performing operations on operands, including processor means for performing said operations on said operands, memory means for storing instructions for directing the operations performed by said processor means, bus means for conducting instructions between said memory means and said processor means, and I/O means for conducting operands between devices external to said digital computer system and said processor means, said processor means comprising:

microcode control store means connected to said bus means for storing sequences of microinstructions corresponding to said instructions, said microcode control store means being responsive to said instructions for providing said corresponding sequences of microinstructions, execution means responsive to said sequences of microinstructions for executing the operations defined by said microinstructions, said execution means including elements defining the machine state of said execution means when executing said microinstructions, execution microinstruction stack means being connected to said execution means and containing at least one microinstruction stack frame for maintaining the machine state of said execution means when executing a microinstruction of a sequence of microinstructions when the execution of said microinstruction has been interrupted, memory microinstruction stack means containing a plurality of further microinstruction stack frames for maintaining the machine states of said execution means when executing previous microinstructions of previous sequences of microinstructions when the execution of said previous microinstructions have been interrupted, and microinstruction stack control means responsive to the operation of said microinstruction stack means and to said memory microinstruction stack means for controlling the transfer of microinstruction stack frames among said execution microinstruction stack means and said memory microinstruction stack means.

2. The digital computer system of claim 1, wherein said processor means further comprises:

monitor microcode control store means for storing sequences of monitor microinstructions, said monitor microcode control store means being responsive to monitor instructions from said memory means to provide said sequences of monitor microinstructions for controlling the monitor system operation of said execution means, and said execution means being responsive to said sequences of monitor microinstructions for executing monitor operations defined by said monitor microinstructions and further comprising monitor microinstruction stack means being connected to said execution means and containing at least one monitor stack frame for maintaining the machine state of said execution means when executing a monitor microinstruction of a sequence of monitor microinstructions when the execution of said monitor microinstruction has been interrupted.

3. The digital computer system of claims 1 or 2 wherein said memory means further comprises:

instruction stack means responsive to the operation of said processor means and containing at least one instruction stack frame for maintaining the machine state of said processor means when executing an instruction when the execution of said instruction has been interrupted.

4. The digital computer system of claims 1 or 2, wherein said processor means further includes:

further execution means connected to said bus means for performing arithmetic operations on certain of said operands, said microcode control store means storing sequences of arithmetic microinstructions said microcode control store means being responsive to arithmetic instructions from said memory means to provide said sequences of arithmetic microinstructions to said further execution means for controlling arithmetic operations of said further execution means, said further execution means being responsive to said sequences of arithmetic microinstructions for executing the arithmetic operations defined thereby, execution arithmetic stack means being connected to said further execution means and containing an arithmetic stack frame for maintaining the current machine state of said further execution means when executing an arithmetic microinstruction of a sequence thereof, and said arithmetic stack means further containing a further arithmetic stack frame for maintaining the machine state of said further execution means when executing a previous arithmetic microinstruction of a previous sequence of arithmetic microinstructions when the execution of said previous arithmetic microinstruction has been interrupted.

5. The digital computer system of claim 4, wherein said memory means further comprises:

instruction stack means responsive to the operation of said processor means and containing at least one instruction stack frame for maintaining the machine state of said processor means when executing an instruction when the execution of said instruction has been interrupted.

6. The digital computer system of claim 4, wherein said memory means further comprises:

memory arithmetic stack means containing a plurality of further arithmetic stack frames for maintaining the machine states of said further execution means when executing other previous arithmetic microinstructions when the execution thereof has been interrupted, and arithmetic stack control means responsive to the operation of said further execution means for providing control signals to said arithmetic stack storage means and to said memory arithmetic stack means for controlling the transfer of arithmetic stack frames between said arithmetic stack storage means and said memory arithmetic stack means.

7. The digital computer system of claim 6, wherein said memory means further comprises:

instruction stack means responsive to the operation of said processor means and containing at least one instruction stack frame for maintaining the machine state of said processor means when executing an instruction when the execution of said instruction has been interrupted.

* * * * *